UNITED STATES PATENT OFFICE.

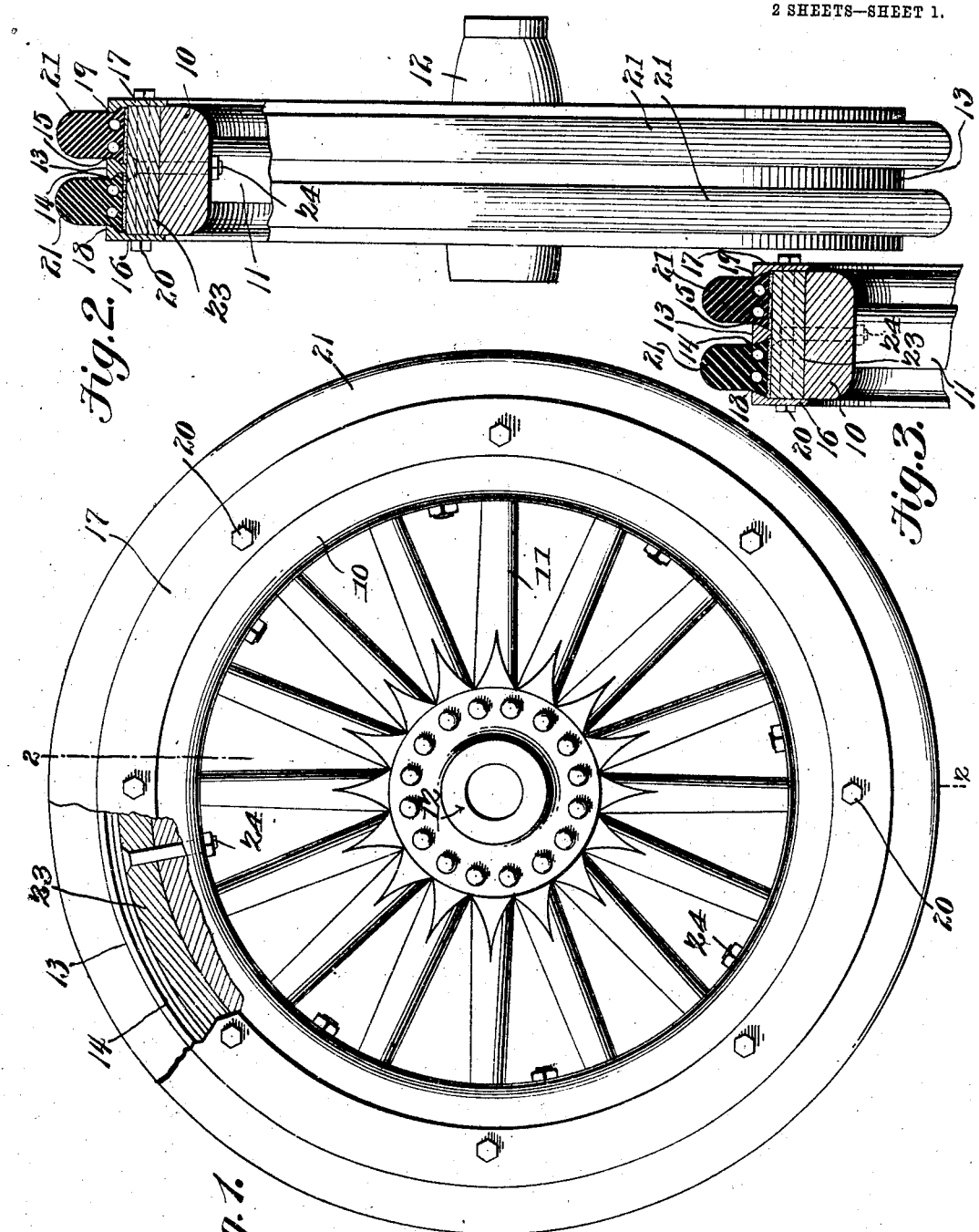

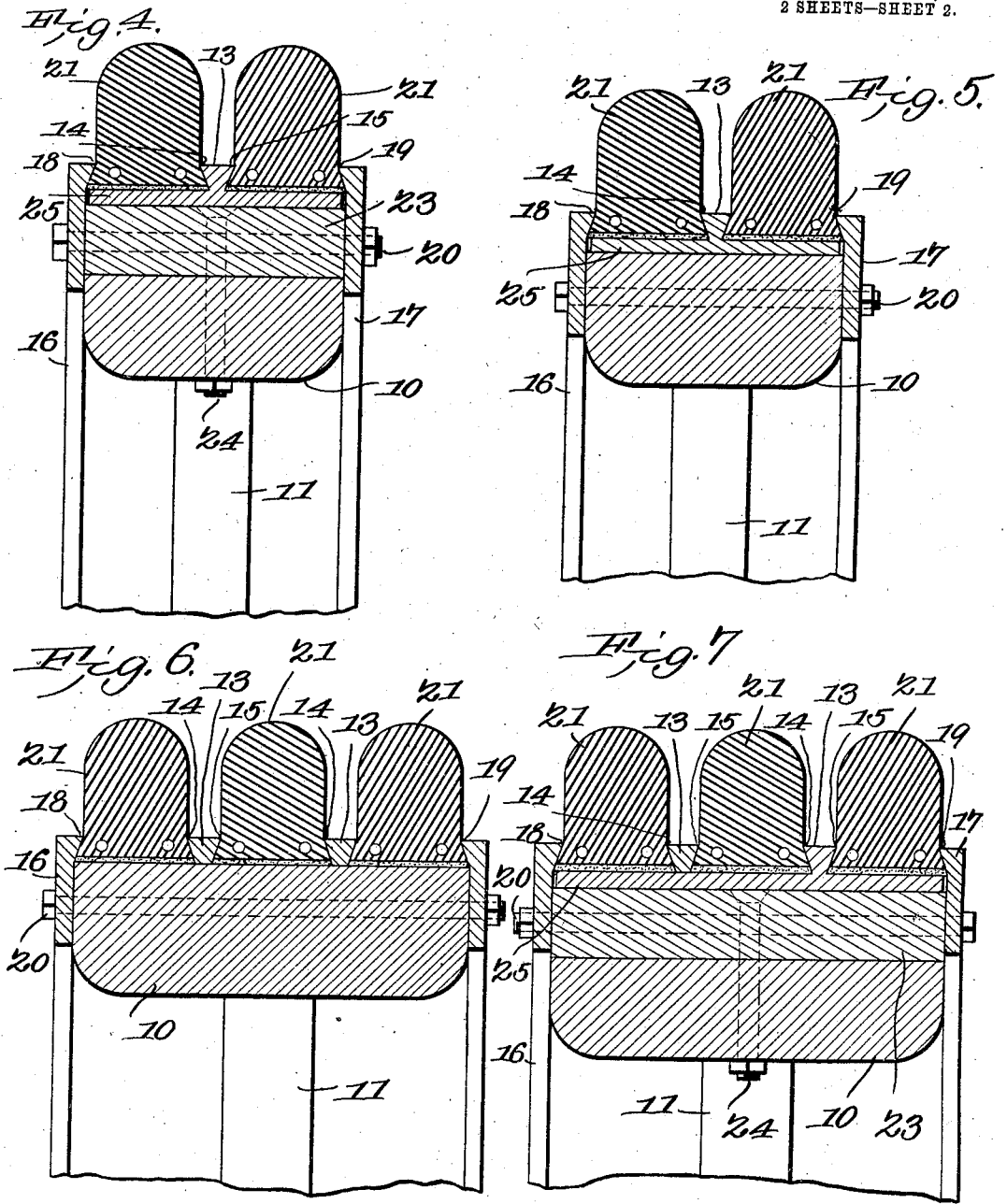

EUGENE FRANKLIN SOBERS, OF BETHLEHEM, PENNSYLVANIA.

WHEEL-TIRE.

No. 812,893.

Specification of Letters Patent.

Patented Feb. 20, 1906.

Application filed September 19, 1905. Serial No. 279,178.

*To all whom it may concern:*

Be it known that I, EUGENE FRANKLIN SOBERS, a citizen of the United States, residing at Bethlehem, in the county of Northampton and State of Pennsylvania, have invented a new and useful Wheel-Tire, of which the following is a specification.

This invention relates to the elastic tires of wheels, and has for its object to improve the construction and increase the efficiency and utility of devices of this character.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that various changes in the form, proportions, and minor details of construction may be resorted to without departing from the principle or sacrificing any of the advantages of this invention within the scope of the appended claims.

In the drawings, Figure 1 is a side elevation, partly in section, and Fig. 2 is an edgewise view, partly in section, of a vehicle-wheel with the improvements applied. Fig. 3 is a sectional detail illustrating a modification in the construction. Figs. 4, 5, 6, and 7 are views similar to Fig. 3, illustrating other modifications in the construction.

The improved device is designed more particularly for application to the heavier class of vehicle-wheels, such as automobiles and the like, and for the purpose of illustration is shown applied to one of the forms of wheels employed upon vehicles of this class, the felly 10, spokes 11, and hub 12 being of the usual form.

The improvement comprises one or more annular members 13, encircling the wheel intermediate the rim or felly and formed with overhanging sides 14 15. The improvement further comprises two annular clamp-plates 16 17, bearing upon opposite sides of the wheel and with inwardly-projecting upper edges 18 19 and secured rigidly to the wheel by transverse clamp-bolts 20 at suitable intervals. Between the intermediate member or members 13 and the clamp-plates 16 17 tire-sections 21 are disposed, the tire-sections being of suitable flexible material, such as rubber, and with the inner portions projecting beneath the overhanging portions of the intermediate annular members and of the clamp members.

The initial width of the tire members is greater than the space they are to occupy between the intermediate members and the clamp members, so that after the parts are in position, the setting of the nuts upon the clamp-bolts will compress the yieldable tires and hold all the parts firmly together and retain them in position. The overhanging form of the members 13–16, and 17, coacting with the projecting lower edges of the tire members, effectually prevents any displacement of the parts.

The sides of the members 13 may be formed with the portions next the felly in parallel lines and the outer portions inclined outwardly or diverging to form the requisite overhang and the inner faces of the clamp-plates 16 17 correspondingly formed, as shown in Figs. 1 and 2, or the overhang portions may be formed without the parallel-sided sections, as shown in Figs. 3 to 7, as preferred.

The felly 10 is preferably supplied with an encircling band 23, secured in place by clamp-bolts 24 at suitable intervals, and with the members 13–16, and 17 engaging this band, as shown. The intermediate members 13 are preferably movable laterally relative to the felly, so that they adapt themselves to the clamp-plates and equalize the pressure upon the tire members. By this means the tire members will be subjected to a uniform pressure no matter what differences there may be between them as to thickness, density, or like qualities.

In Figs. 4 and 5 another modified form of the construction is shown, consisting in forming the intermediate member 13 integral with a band 25 encircling the supplemental rim 23, as in Fig. 4, or applied directly to the felly 10, as in Fig. 5, the band 25 being preferably slightly less in width than the rim 23 and felly 10 to permit a degree of lateral movement to cause the tire members 21 to move readily, adapt themselves to the clamp-plates and intermediate members, and to equalize the pressure upon the tire members in the same manner as when the members 13 are constructed and arranged as shown in Figs. 2 and 3.

In Fig. 6 a modified construction is shown with three of the tire members 21 and two of the floating intermediate members 13 arranged upon the wheel, and in Fig. 7 is shown a modified arrangement of the parts with three of the tire members and two of the intermediate members 13 coacting with one of the bands 25, similar to the structure shown in Figs. 4 and 5. In the modified structure shown in Fig. 7 one of the members 13 is slidable upon the band 25, while the other is integral therewith, which arrangement may be employed, if preferred. Thus any number of the relatively small tire members 21 may be employed upon a single wheel-felly, according to the size of the vehicle-body.

With comparatively light vehicles two of the tire members only will be required and the number increased with increased weight of the vehicles. By this arrangement a wheel capable of sustaining a very heavy weight may be constructed with a tire of comparatively light weight and small expense and possessing the same strength and durability of the larger and more expensive tires. Another advantage of this arrangement is that in event of the fracture of one of the tire members it can be replaced at comparatively small expense and without disconnecting the remaining tire members.

Having thus described the invention, what is claimed is—

1. The combination with a vehicle-wheel of two or more annular members movably disposed relative to the felly portion of the same and with the opposite edges overhanging, annular clamp-plates bearing against the sides of the wheel and with their inner faces overhanging, means for securing said clamp-plates to the wheel, and elastic tire members encircling the wheel between said annular members and said clamp-plates and with the side faces projecting beneath the overhanging portions of the clamp-plates and annular members.

2. The combination with a vehicle-wheel of a band encircling the felly portion of the same, means for detachably securing said band to the felly, two or more annular members movably bearing upon said band and with the sides overhanging laterally, annular clamp-plates bearing upon the edges of said band and with their inner faces overhanging the band, means for securing said clamp-plates to the band, and elastic tire members bearing upon the band between said annular members and the clamp-plates and formed with the side faces projecting beneath the overhanging portions of said annular members and clamp-plates.

3. The combination with a vehicle-wheel of a band encircling the felly and with an annular rib integral therewith and with side faces overhanging the band, annular clamp-plates bearing against the sides of the wheel and with their inner faces overhanging the band and elastic tire members encircling the wheel between said annular rib and annular clamp-plates and bearing upon said band and with the side faces of the tire members projecting beneath the overhanging portions of the clamp-plates and ribs.

In testimony that I claim the foregoing as my own I have hereto affixed my signature in the presence of two witnesses.

EUGENE FRANKLIN SOBERS.

Witnesses:
ROBERT J. LILLY,
HENRY B. STERN.